S. B. MOORE.
CHANGE SPEED GEAR.
APPLICATION FILED APR. 26, 1920.
1,345,688.
Patented July 6, 1920.
3 SHEETS—SHEET 1.
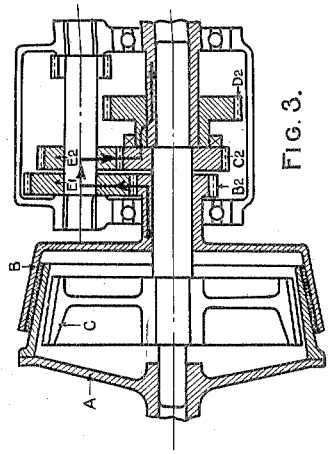
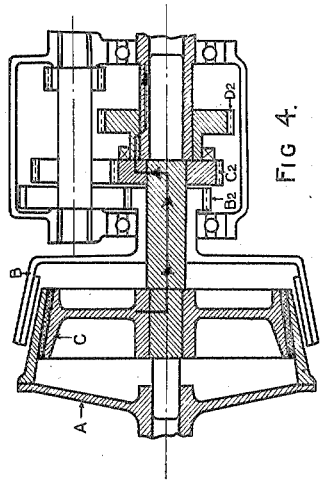
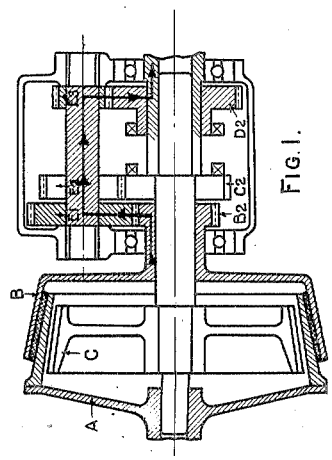
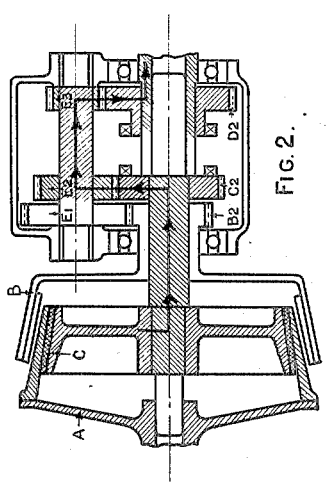
INVENTOR.
Swinfen Bramley Moore.
per Robert D. Phillips
Attorney.

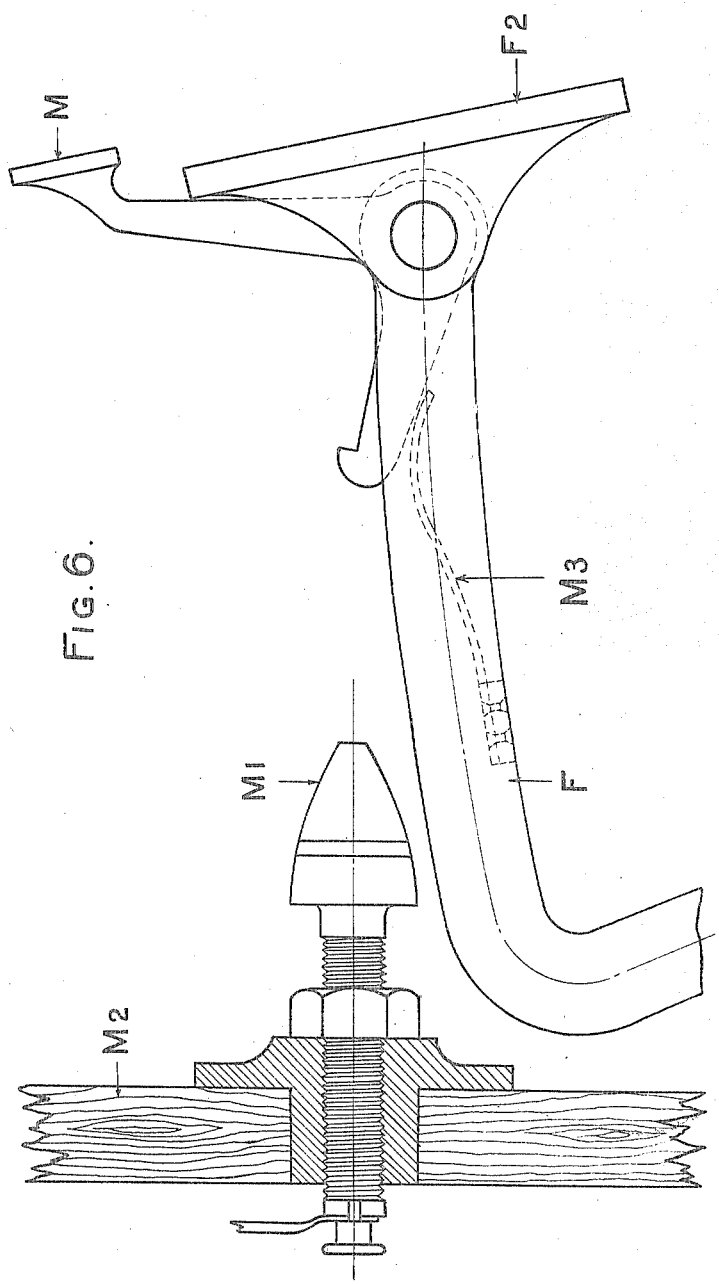

UNITED STATES PATENT OFFICE.

WINFEN BRAMLEY MOORE, OF HUDDERSFIELD, ENGLAND.

CHANGE-SPEED GEAR.

1,345,688.

Specification of Letters Patent.

Patented July 6, 1920.

Application filed April 26, 1920. Serial No. 276,816.

*To all whom it may concern:*

Be it known that I, SWINFEN BRAMLEY MOORE, a subject of the King of Great Britain and Ireland, residing at 61 Trinity street, Huddersfield, in the county of Yorks, England, have invented a new and useful Improvement in Change-Speed Gears, of which the following is a full and complete specification.

This invention relates to improvements in change speed gears in which trains of spur or other gear wheels are brought into operation for the purpose of obtaining the desired variation of the relative speed of the driving and driven shafts, and the objects of my improvement are first to obtain a maximum variation of speed with a minimum number of gear wheels, secondly to provide a simple method of varying the relative direction of motion of the driving and driven shafts, thirdly to facilitate the operation of changing the speeds and fourthly to provide a gear box in which the weight and size is in inverse ratio to the number of changes provided.

I attain these objects by the construction shown in the accompanying drawing in which:

Figures 1, 2, 3 and 4 are diagrams showing how the different speeds are obtained Fig. 1 showing the first or lowest speed.

Fig. 2 the second speed, Fig. 3 the third speed, and Fig. 4 the fourth and top speed. (In each of these views only those parts of the mechanism actually transmitting the drive are section lined.)

Fig. 6 is a broken view on an enlarged scale showing a device for locking the operating foot lever.

Throughout the views similar parts are marked with like letters of reference.

Figure 5:
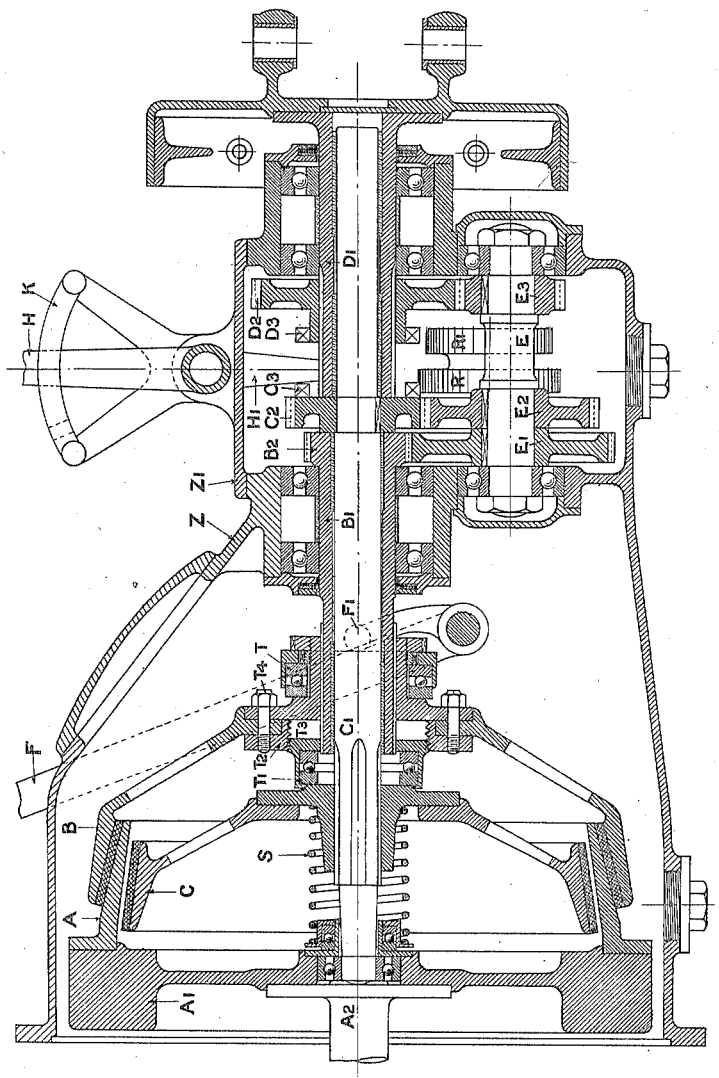
Fig. 5 is a view in longitudinal section showing a complete gear.

The essential feature of this gear is the use of a double acting or compound clutch for transmitting the power to the gearing there being two concentrically arranged driving shafts $C^1$ and $B^1$ and one axially arranged driven shaft $D^1$. Both the driving shaft $B^1$ and the driven shaft $D^1$ are of tubular form and are mounted on the driving shaft $C^1$ so as to take a bearing on said shaft, the shafts $B^1$ and $D^1$ being mounted in suitable bearings in the gear box Z. On the shaft $A^2$ from or through which the power is derived is mounted one of the elements A of the double-acting clutch the other elements B and C of said clutch being carried by the driving shafts $B^1$ and $C^1$ respectively. The elements B and C of the clutch are coupled together so that they work in unison one coming into engagement with the element A as the other becomes disengaged from said element. The elements B and C are operated in the usual manner by means of a foot operated lever F and fork $F^1$ working in the usual gate guide and operating through thrust bearings T and $T^1$ against the action of a spring S located between the element A of the clutch and the elements C and B of same.

To provide for the adjustment between the elements B and C of the clutch a thrust ring $T^2$ is mounted onto the element B by means of a series of bolts $T^4$. This thrust ring $T^2$ is threaded on a thrust ring $T^3$ which is so mounted on the driving shaft $B^1$ as to slide axially thereon but to have no independent rotary movement. By adjusting the relative positions of these two thrust rings $T^2$ and $T^3$—which is effected by removing the bolts $T^4$ and turning the ring $T^2$ on the ring $T^3$—the distance between the two elements B and C can be varied as desired.

On the back end of the tubular shaft $B^1$ is fixed a pinion $B^2$ and on the inner shaft $C^1$ between the inner ends of the two tubular shafts $B^1$ and $D^1$ is fixed a pinion $C^2$. On the shaft $D^1$ is mounted—so as to rotate therewith and slide axially in relation thereto—a pinion $D^2$ which carries dogs $D^3$ adapted to engage similar dogs $C^3$ carried by the pinion $C^2$.

On a counter shaft E mounted in suitable bearings in the gear box Z in parallel relation to the driving shaft $C^1$ are fixed three pinions $E^1$, $E^2$, and $E^3$, the two former which are located at the forward end of the shaft are in constant mesh with the pinions $B^2$ and $C^2$ respectively. The pinion $E^3$ which is located at the back end of the shaft is adapted to mesh with the pinion $D^2$.

On a second countershaft (not shown in the drawings) are mounted the pinions R and $R^1$ for giving the reverse by engagement with the pinions $D^2$ and $E^3$ when the former is in its central position *i. e.* out of gear with the pinion $E^3$.

The sliding pinion $D^2$ and the sliding pinions R and $R^1$ are manipulated by means of a single hand lever H moving in a gate K carried by the lid $Z^1$ of the box Z, and operating through two selector rods, in the usual manner, the construction and arrangement being such that when the lever is in its upright central position all the gears are out of action. From this position the lever has three movements a direct forward movement which gives the slow speeds, a direct rearward movement which gives the high speeds, and a combined transverse and forward movement which gives the reverse. For the sake of distinctness the pinion $D^2$ is shown in Fig. 1 in engagement with the pinion $E^3$ to produce the first or lowest gear although the operating hand lever H is shown in its neutral position.

When the lever H is pushed forward the pinion $D^2$ is brought into engagement with the pinion $E^3$ and when the clutch lever F is pushed and kept right forward the element B of the clutch engages the element A thereof. This produces the first or lowest speed the drive from the motor shaft being through the elements A and B of the clutch, the driving shaft $B^1$ the pinions $B^2$ and $E^1$, the countershaft E and the pinions $E^3$ and $D^2$ to the driven shaft $D^1$. To obtain the next speed the clutch lever F is merely released—the hand lever H remaining in its forward position—which allows the spring S of the clutch to come into action which takes the element B of the clutch out of engagement with the element A and brings the element C into engagement with said element A. The drive is now through the elements A and C of the clutch, the driving shaft $C^1$, the pinions $C^2$ and $E^2$, the countershaft E and the pinions $E^3$ and $D^2$. To obtain the third gear the hand lever H is moved to its rearward position and the clutch lever F is pressed and kept right forward. The former brings the pinion $D^2$ into engagement with the pinion $C^2$ and the latter takes the element C of the clutch out of engagement with the element A and brings the element B into engagement with said element A. The drive is now through the elements A and B of the clutch, the driving shaft $B^1$, the pinions $B^2$ and $E^1$, the countershaft E and the pinion $E^2$ and the coupled pinions $C^2$ and $D^2$. To obtain the fourth or highest speed the hand lever H is left in its rearward position and the clutch lever F is released. This allows the spring of the clutch to take the element B of the clutch out of engagement with the element A and to bring the element C into engagement with said element A. The drive is now through the elements A and C of the clutch, the driving shaft $C^1$ and the coupled pinions $C^2$ and $D^2$ directly to the driven shaft $D^1$.

It will thus be seen that the hand lever is only moved when starting up, when changing from the second to the third speed or vice versa and when permanently stopping the drive.

To obtain the reverse the hand lever H is moved first transversely and then forward in the gate. This leaves the pinion $D^2$ in its neutral position and brings the pinions R and $R^1$ into mesh with the pinions $D^2$ and $E^3$ respectively. If the clutch lever F is now pushed and held right forward a low reverse speed suitable for traffic work will result and when the foot lever is released a higher reverse speed—suitable for a clear road or country work—will result.

Instead of mounting the pinion $D^2$ on the driven shaft as before described it may be loosely mounted on such shaft and remain in constant mesh with the pinion $E^3$ on the counter shaft and a sliding dog clutch be mounted on the spliced part of the driven shaft $D^1$ for the purpose of coupling either the pinion $C^2$ or the pinion $D^2$ to said shaft. In this construction the reverse pinion $R^1$ would be in constant mesh with the pinion $D^2$ and the pinion $E^3$ would be arranged to slide on the countershaft so as to engage the reverse pinion R.

In order to avoid the necessity of having to keep a constant pressure on the foot lever during the time the first and third speeds are employed, a locking device may be used to fix said lever in its forward position. A convenient device is that shown in Fig. 6 which consists of a bell-crank trip lever M pivoted to the foot lever F near the foot plate $F^2$ thereof. One arm of this lever is shaped to enable it to be operated by the toe of the driver and the other arm—which is pressed upward by a spring such as $M^3$—is shaped to adapt it to engage with an adjustable catch $M^1$ mounted on the dashboard $M^2$.

What I claim is:—

1. A change speed gear comprising an inner driving shaft; two tubular axially arranged shafts mounted on said inner shaft one of which is the second driving shaft and the other of which is the driven shaft; a double acting clutch comprising a compound element the two parts of which are mounted respectively on the two driving shafts, a single element carried by the power shaft, a spring for bringing one of the parts of the compound element into engagement with the single element and for keeping the other part of the compound element out of engagement with said single element, and hand-operated means for reversing said engagements against the action of the spring a countershaft in parallel alinement with the driving and driven shafts; a pinion fixed on the tubular driving shaft and gearing with a pinion fixed on the countershaft; a pinion on the inner driving shaft gearing with a second pinion fixed on the countershaft; a third pinion fixed on said countershaft; and a sliding pinion on the driven shaft adapted either to be put into mesh with the third pinion on the countershaft, to be brought into couple with the pinion on the inner driving shaft by means of a clutch, or to be retained in a neutral position out of engagement with either the third pinion on the countershaft or with the pinion on the inner driving shaft.

2. A change speed gear comprising two concentrically arranged shafts; a single shaft axially arranged in relation to said concentrically arranged shafts; a double acting clutch comprising two elements mounted respectively on the concentrically arranged shafts, a single element mounted on the power shaft, a spring for bringing one of said two elements into engagement with the single element and for keeping the other of the two elements out of engagement with the single element, and hand-operated means for reversing said engagements against the action of the spring; a countershaft in parallel alinement with the driving and driven shafts; and six gear wheels, one of which is mounted on the tubular driving shaft and engaging with a gear wheel mounted on the countershaft, another of which is mounted on the driven shaft and adapted to take the drive from a mating gear wheel mounted on the countershaft, and another of which is mounted on the inner driving shaft and is adapted to be locked either to one of the two elements of the clutch or to the driven shaft or to both simultaneously, said gear wheel engaging with a third gear wheel mounted on the countershaft.

3. In a change speed gear the combination of two concentrically arranged driving shafts; a driven shaft arranged in axial alinement with said driving shafts; a double clutch comprising one driving element and two driven elements said latter elements being mounted respectively on the two driving shafts, a spring for bringing one of the driven elements into engagement with the driving element, and hand-operated gear for bringing the other driven element into engagement with the driving element and at the same time bringing the first named driven element out of engagement with the driving element; a countershaft in parallel alinement with the driving and driven shafts; three spur pinions fixed on said countershaft; a spur pinion fixed on the outer driving shafts and in constant mesh with one of the pinions on the countershaft; a pinion fixed on the inner driving shaft and in constant mesh with another of the pinions on the countershaft; a spur pinion mounted on the driven shaft and meshing with the third pinion on the countershaft; and a sliding clutch mounted on the driven shaft and adapted to couple better said pinion or the pinion fixed on the inner driving shaft to the driven shaft.

4. In a change speed gear the combination of two concentrically arranged driving shafts; a driven shaft arranged in axial alinement with said driving shafts; a double clutch comprising one driving element and two driven elements said latter being mounted respectively on the two driving shafts, a spring for bringing one of the driven elements into engagement with the driving element, and hand operated gear for bringing the other driven element into engagement with the driving element and at the same time bringing the first named driven element out of engagement with the driving element; a countershaft in parallel alinement with the driving and driven shafts; three spur pinions fixed on said countershaft; a spur pinion fixed on one of the driving shafts and in constant mesh with one of the pinions on the countershaft; a pinion fixed on the other driving shaft and in constant mesh with another of the pinions on the countershaft; a second countershaft arranged in parallel alinement with the first countershaft; two spur pinions fixed on said second countershaft; a spur pinion mounted to slide on the driven shaft and adapted to mesh with the third pinion on the first countershaft; hand-operated mechanism for bringing said sliding pinion either into mesh with the pinion on the first countershaft or into a neutral position; and hand-operated mechanism for bringing the two pinions on the second countershaft into mesh respectively with the sliding pinion on the driven shaft and the third pinion on the first countershaft.

SWINFEN BRAMLEY MOORE.